United States Patent [19] [11] Patent Number: 4,609,962
Arai et al. [45] Date of Patent: Sep. 2, 1986

[54] MAGNETIC RECORDING MEDIUM HAVING IMPROVED WEATHER RESISTANCE

[75] Inventors: Yoshihiro Arai; Akira Nahara; Makoto Nagao; Kiyotaka Fukino, all of Kanagawa, Japan

[73] Assignee: Fuji Photo Film Co., Ltd., Kanagawa, Japan

[21] Appl. No.: 596,789

[22] Filed: Apr. 4, 1984

[30] Foreign Application Priority Data

Apr. 4, 1983 [JP] Japan ................................. 58-59076

[51] Int. Cl.$^4$ .......................... G11B 23/00; G11B 5/74
[52] U.S. Cl. ..................................... 360/131; 428/900
[58] Field of Search ...................... 360/131, 134, 135; 427/131, 132; 428/900

[56] References Cited

U.S. PATENT DOCUMENTS 4,246,316 1/1981 Aonuma et al. .................. 427/131
4,414,271 11/1983 Kitamoto et al. ................ 427/131
4,448,837 5/1984 Ikeda et al. ..................... 428/900
4,455,345 6/1984 Miyatuka et al. ................ 428/900
4,503,119 3/1985 Shirahata et al. ................ 428/900

FOREIGN PATENT DOCUMENTS 0018025 1/1982 Japan ................................. 360/131
0092401 6/1982 Japan ................................. 360/131

Primary Examiner—John H. Wolff
Assistant Examiner—Andrew L. Sniezek
Attorney, Agent, or Firm—Sughrue, Mion, Zinn, Macpeak, and Seas

[57] ABSTRACT

A metal thin film type magnetic recording medium having an improved weather resistance is disclosed, which comprises a non-magnetic support base having provided thereon a ferromagnetic metal thin film comprised of column-shaped clusters of ferromagnetic particle having longitudinal axes inclined to the surface plane of the support base and a layer of a chromium compound such as Cr and $Cr_2O_3$ covering the surfaces of the column-shaped clusters.

10 Claims, 5 Drawing Figures

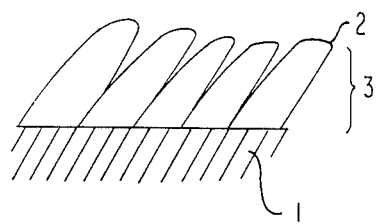
FIG. 1
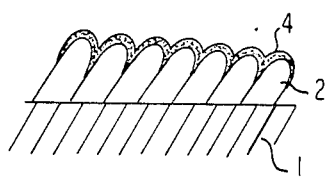
FIG. 2
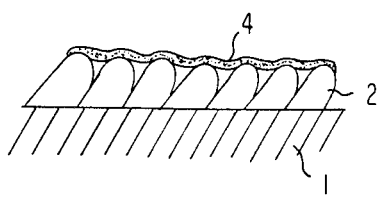
FIG. 3
FIG. 4
FIG. 5
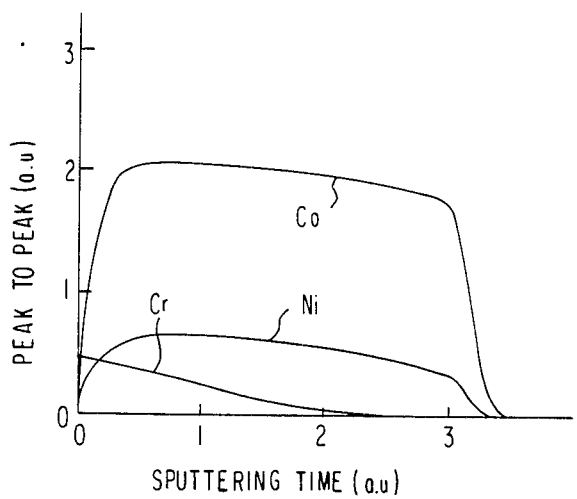
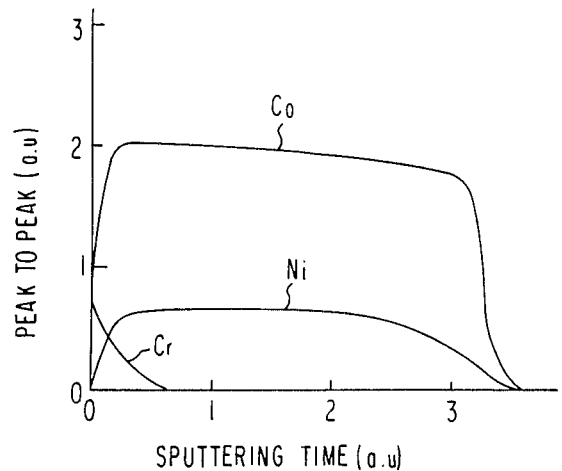

MAGNETIC RECORDING MEDIUM HAVING IMPROVED WEATHER RESISTANCE

FIELD OF THE INVENTION

The present invention relates to a magnetic recording medium and, more particularly, to a metal thin film type of magnetic recording medium having improved weather resistance.

BACKGROUND OF THE INVENTION

Most conventional magnetic recording media are of the coating type of magnetic recording media, and they are usually obtained by coating on a non-magnetic support a magnetic powder made up of a magnetic oxide, a magnetic alloy or the like together with a binder such as a vinyl chloride-vinyl acetate copolymer, a styrene-butadiene copolymer, an epoxy resin, a polyurethane resin or so on, and then drying the resulting coat.

In recent years, the demand for high density recording has been increased and therewith, the so-called non-binder type of magnetic recording media, which have on non-magnetic supports thin films made up of ferromagnetic metals alone without containing any binders as described above which are formed using a vacuum evaporation technique, a sputtering technique, an ion plating technique, a metal plating technique or the like, having attracted the attention in this art (U.S. Pat. Nos. 2,671,034, 3,329,601, 3,342,633, 3,156,860 and 3,615,911).

However, a magnetic metal thin layer can be readily corroded, because the thin layer consists of clusters of magnetic metal particles having a column structure and therefore, voids are formed among column-shaped particles, and along these voids the corrosion tends to occur. Although the above-described defect is a serius problem to be solved since it lowered the reliability as a recording medium, solutions to this problem have not yet been found.

SUMMARY OF THE INVENTION

An object of the present invention is to provide a metallic thin film type of magnetic recording medium having improved weather resistance.

The above-described object of the present invention is attained with a magnetic recording medium comprising a non-magnetic support base having provided thereon a ferromagnetic metal thin film composed of clusters of ferromagnetic particles having a column structure, longitudinal axes of which is inclined to the surface plane of the support base, and a layer of a chromium compound covering the surfaces of the clusters.

BRIEF DESCRIPTION OF THE DRAWINGS

FIGS. 1 and 2 are sectional sketches for illustrating the magnetic recording medium of the present invention.

FIG. 3 is a sectional sketch for illustrating a magnetic recording medium obtained in Comparative Example as described later.

FIGS. 4 and 5 are graphs showing profiles of Cr films formed in Example 1 and Comparative Example respectively with the air of Auger electron spectroscopy.

DETAILED DESCRIPTION OF THE INVENTION

The magnetic recording medium of the present invention, as shown in FIG. 1, is basically constructed by a support 1 and a magnetic recording layer 3 comosed of column-shaped clusters of ferromagnetic particles 2 provided on the support.

Suitable materials which can be used for the non-magnetic support in the present invention include plastics such as polyethylene terephthalate, polyimide, polyamide, polyvinyl chloride, cellulose triacetate, polycarbonate, polyethylene naphthalate, etc. Also, non-magnetic metals such as Al, Cu, SUS, etc., and inorganic substances such as glass, ceramics, etc. may be used as the non-magnetic support. Of these, polyethylene terephthalate is preferably used for the support. The thickness of support is preferably 4 to 30 $\mu$m. These supports may be provided with a layer containing inorganic particles and a binder on its surface opposite the surface on which a ferromagnetic metal thin film is to be formed.

Suitable examples of the inorganic particles include calcium carbonate, carbon black particles and so on, and preferable examples of the binder include nitrocellulose, polyurethane, isocyanate, polyester and mixtures thereof. On the occasion that the support is a plastic film, it is to be desired that the film should have a surface roughness (Ra) of 0.012 $\mu$m or less.

A ferromagnetic metal thin film made up of clusters of ferromagnetic particles having a column structure has a high coercive force and the column structure can easily be formed by an inclined evaporation technique as described in U.S. Pat. No. 3,342,632. Therefore, it is desirable that the ferromagnetic metal thin film of the present invention has an oblique column structure. The oblique column structure can be formed by, for example, depositing Co or an alloy containing Co at an angle onto a support. The thickness of ferromagnetic metal thin film is generally 20 to 20,000 Å, preferably 50 to 10,000 Å and more preferably 200 to 5,000 Å. The diameter of column is generally 20 to 10,000 Å, preferably 20 to 2,000 Å and more preferably 20 to 1,000 Å. In general, the diameter of column increases as the thickness of ferromagnetic metal film increases. For example, the diameter of column ranges from about 100 to 900 Å when the metallic thin film has a thickness of 1,500 Å.

Suitable examples of the magnetic metal materials which can be used in the present invention include metals such as Fe, Co, Ni, etc.; and ferromagnetic alloys containing as a major component Fe-Co, Fe-Ni, Co-Ni, Fe-Co-Ni, Fe-Cu, Co-Cu, Ni-Cu, Fe-Cr, Co-Cr, Ni-Cr, Fe-Co-Cr, Ni-Co-Cr, Fe-Co-Ni-Cr, etc. Among these magnetic materials, especially favorable ones are Co and alloys containing Co in proportions of 75 wt% or more.

To these magnetic materials may be added metals such as W, Mo, Ti, Mg, Si, Al, etc. in amounts of 30 wt% or less. Further, non-metals such as C, B, O, N, P, etc. may be incorporated in a magnetic thin metal film in amounts of 30 wt% or less. These components may be incorporated into a mother material for forming the thin film. Also, they may be added to a gaseous atmosphere as some of its constituents in which the film formation is to be carried out.

For instance, in forming the above-described metal thin film inside a vacuum evaporation chamber, oxygen gas is introduced into the chamber, and in the atmosphere of oxygen gas may be carried out the evaporation.

In the magnetic recording medium of the present invention, a layer of a chromium compound is additionally formed on the layer of the above-described ferromagnetic metal thin film in such a condition that bare surface parts of individual column-shaped particles may be covered therewith in a thickness of 10 to 1,000 Å, preferably 10 to 500 Å, more preferably 10 to 150 Å (which is designated by numeral 4 on FIG. 2). The term chromium compound used herein is intended to include Cr, chromium oxides, chromium carbides and chromium nitrides, and Cr and $Cr_2O_3$ are particularly preferred. These compounds may contain metals such as Fe, Ni, Mn, Si, etc. in amounts of 30 wt% or less, preferably 20 wt% or less. The chromium compounds contain at least 50 wt% of chromium.

The chromium compound layer can be formed so as to invade into the void part of the column structure of the ferromagnetic metal thin film using an inclined evaporation technique, an ion plating technique, a sputtering technique, a usual low vacuum evaporation coating technique or a combination of two or more thereof. In employing the inclined evaporation technique, it is necessary to set an incidence angle of the vapor flow of the chromium compound in the same direction as that of the incidence angle used upon the formation of the ferromagnetic metal thin film. On the other hand, in employing the low vacuum evaporation coating technique, it is desirable that the evaporation is carried out under pressure ranging from $4 \times 10^{-4}$ Torr to $2 \times 10^{-1}$ Torr in order to take advantage of the invasion of evaporated particles in every direction.

The present invention aims at improving weather resistance characteristics by forming a layer made up of a chromium-containing inorganic substance so as to invade deeply into voids present among column-shaped clusters of ferromagnetic particles which constitute the layer of the ferromagnetic metal thin film and therethrough, so as to cover the column-shaped clusters. The deep invasion of the chromium compound layer into the voids present among the column-shaped clusters can be easily judged by determining the profile of the chromium content in the depth direction of the film using Auger electron spectroscopy.

The magnetic recording medium of the present invention may also have a lubricant layer. The lubricant layer is provided on the chromium compound layer to improve running characteristics and still made durability characteristics of the resultant magnetic recording medium. Suitable examples of lubricants which can be used for the abovedescribed purpose include higher fatty acids, higher fatty acid esters and combinations thereof. Preferred examples of higher fatty acids include lauric acid, myristic acid, palmitic acid, stearic acid, behenic acid, oleic acid, linoric acid, linolenic acid, arachidonic acid and the like. As for the fatty acid esters, methyl stearate, ethyl palmitate, stearic acid monoglyceride, etc. are preferably employed.

The lubricant layer can be formed using a vacuum evaporation coating technique, an ion plating technique, or any of the conventional coating techniques.

An essential feature of the present invention involves forming a chromium compound layer on the magnetic metal thin film layer made up of, for example, Co or a Co-containing alloy in such a condition that the chromium compound layer may cover naked parts of the individual column-shaped cluster of ferromagnetic particles.

Consequently, corrosion through an overcoat which has been frequently observed in conventional recording media of magnetic metal thin film type can be greatly reduced in the present invention. This effect is presumed to result from the excellent weatherproofing function inherent in the chromium compound, that is to say, such a function as to protect hydroxyl ions, $OH^-$, from invading between the column-shaped clusters in the magnetic metal thin film. Accordingly, the generation of corrosion is made considerably difficult. In conventional recording media of the above-described type, a marked progress of corrosion is thought to be brought about by hydroxy ions, $OH^-$, which have invaded through openings in the covercoats and have come into contact directly with column-shaped clusters of ferromagnetic particles.

According to the present invention, the column-shaped clusters of ferromagnetic particles are covered with a chromium compound excellent in weather resistance and thereby, hydroxy ions are prevented from coming into direct contact with the column-shaped clusters of ferromagnetic particles; and further, the chromium compound layer is so formed as to fill up the voids among the column-shaped clusters. Therefore, corrosion rarely occurs even if invasion of hydroxy ions happens, or granting that it occurs, the progress of corrosion requires a longer time in comparison with conventional cases.

The present invention will now be illustrated in more detail by reference to the following examples and comparative example.

EXAMPLE 1

A magnetic metal thin film layer having a thickness of 1,400 Å was formed by evaporating an alloy having a composition of $Co_{80}Ni_{20}$ at an incidence angle of 50° onto a 23 μm-thick polyethylene terephthalate film under a pressure of $1.8 \times 10^{-5}$ Torr using an inclined incidence evaporation technique. Thereafter, Cr was evaporated under a pressure of $8 \times 10^{-4}$ Torr to form a layer 25 Å thick on the above-described magnetic metal thin film by using a similar inclined incidence evaporation technique. In forming the metallic chromium layer, the evaporation was carried out at an incidence angle of 45° with the intention of making the direction of incidence of Cr vapor flow nearly equal to that of the Co alloy vapor flow for forming the magnetic metal thin film.

The magnetic recording medium having the metallic chromium layer formed on the ferromagnetic metal thin film layer in the manner as described above was examined in regard to the variations of Co, Ni and Cr contents in the depth direction of the film by means of Auger electron spectroscopy, and the results obtained were depicted in FIG. 4. It can be seen from this figure that Cr element invaded deeply into voids present in the column structure of the magnetic metal layer 3.

Further, it was confirmed by the ESCA measurement that Cr element was partly present in an oxidized condition.

The evaluation of weather resistance was made using this medium. For the evaluation, this medium was kept for 2 weeks in a thermostat maintained at 60° C., 90% RH and thereafter, the amount of corrosion, if any, was observed. As a result of observation, no rusted parts were detected.

EXAMPLE 2

On the magnetic metal thin film formed in the same manner as in Example 1, a $Cr_2O_3$ layer having a thickness of 50 Å was formed by carrying out the inclined incidence evaporation of Cr under an atmosphere of oxygen having a pressure of $6 \times 10^{-4}$ Torr wherein electric discharge was generated by applying 13.56 MHz of high frequency electric power to a 200 watt coil. The incidence angle of the Cr vapor flow in the inclined evaporation described above was set similarly to Example 1.

The variations of Co, Ni and Cr contents in the depth direction of the magnetic recording medium having the $Cr_2O_3$ layer formed on the ferromagnetic metal thin film layer in the manner described above, which were examined using Auger electron spectroscopy, had similar tendencies to Example 1 respectively. It has been found from this measurement that Cr element invaded deeply into voids present in the column structure of the magnetic metal layer.

Further, it was confirmed by the ESCA measurement that Cr element was mostly present in an oxidized state, that is, in a form somewhat similar to $Cr_2O_3$.

The evaluation of weather resistance was made using this medium in the same manner as in Example 1. In analogy with the result of Example 1, rusted parts were hardly observed.

COMPARATIVE EXAMPLE

On the magnetic metal thin film formed in the same manner as in Example 1, a metallic chromium layer having a thickness of 25 Å was formed by carrying out general vacuum evaporation coating under Cr vapor pressure of $2 \times 10^{-5}$ Torr. The evaluation of weather resistance of this medium was made in the same manner as in Example 1. As the result of observation, rusted parts were detected over almost the whole surface of the medium. The profile of Cr in the depth direction of this medium which was determined by Auger electroscopy was observed only in the vicinity of the surface, as illustrated in FIGS. 3 and 5.

In addition, a ratio of saturation magnetization which the magnetic recording medium exhibited before carrying out the above-described evaluation to that which the magnetic recording medium exhibited after receiving the experiment for the evaluation was determined. This ratio can be represented by the term demagnetization, and demagnetization of each medium are given in Table 1. In Table 1, the values for Examples 1 and 2 and Comparative Example and when only the magnetic layer made up of CoNi was provided on the non-magnetic support are set forth together for facilitating comparison.

TABLE 1

| Sample | Demagnetization | Rust Generation |
| --- | --- | --- |
| Example 1 | 4% | not observed |
| Example 2 | 5% | hardly observed |
| Comparative Example | 9–11% | lightly observed |
| CoNi layer alone in Example 1 | 14–16% | considerably observed |

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic planar support base having provided thereon:
   a ferromagnetic metal thin film comprised of column-shaped clusters of ferromagnetic particles having longitudinal axes inclined to the surface plane of the support base, formed by inclined evaporation of the ferromagnetic particles; and
   a layer of chromium or a chromium compound covering the surfaces of said column-shaped clusters, formed by (i) inclined evaporation of the chromium or chromium compound at an incidence angle of the vapor flow of the chromium or chromium compound in the same direction as that of the incidence angle used to form the ferromagnetic metal thin film, or (ii) vacuum evaporation of the chromium or chromium compound under a pressure ranging from $4 \times 10^{-4}$ Torr to $2 \times 10^{-1}$ Torr.

2. A magnetic recording medium as claimed in claim 1, wherein the column-shaped clusters of ferromagnetic particles have a diameter in the range of from about 20 Å to about 1,000 Å.

3. A magnetic recording medium as claimed in claim 2, wherein the ferromagnetic metal thin film has a thickness in the range of from about 200 to about 5,000 Å.

4. A magnetic recording medium as claimed in claim 1, wherein the ferromagnetic metal thin film is comprised of cobalt or an alloy containing cobalt in a proportion of 75 wt% or more.

5. A magnetic recording medium as claimed in claim 1, wherein the chromium compound is selected from the group consisting of chromium oxides, chromium carbides and chromium nitrides.

6. A magnetic recording medium as claimed in claim 5, wherein the chromium compound is $Cr_2O_3$.

7. A magnetic recording medium as claimed in claim 1, wherein a lubricant layer is further provided on the layer of the chromium or chromium compound.

8. A magnetic recording medium as claimed in claim 7, wherein the lubricant layer is formed of a higher fatty acid, a higher fatty acid ester or a combination thereof.

9. A magnetic recording medium as claimed in claim 1, wherein the layer of chromium or a chromium compound is formed of $Cr_2O_3$.

10. A magnetic recording medium as claimed in claim 1, wherein the layer of chromium or a chromium compound is formed of chromium.

* * * * *